(12) United States Patent
Chanda et al.

(10) Patent No.: US 8,443,299 B1
(45) Date of Patent: May 14, 2013

(54) RENDERING TEXT IN A BREW DEVICE

(75) Inventors: Rupen Chanda, San Francisco, CA (US); Jack Chen, Belmont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 307 days.

(21) Appl. No.: 12/814,141

(22) Filed: Jun. 11, 2010

Related U.S. Application Data

(63) Continuation of application No. 11/670,333, filed on Feb. 1, 2007, now Pat. No. 7,743,339.

(51) Int. Cl.
*G06F 3/048* (2006.01)

(52) U.S. Cl.
USPC .......................................... 715/802; 715/804

(58) Field of Classification Search ............... 715/802, 715/804, 794
See application file for complete search history.

(56) References Cited

U.S. PATENT DOCUMENTS

| | | | |
|---|---|---|---|
| 5,797,098 A | 8/1998 | Schroeder et al. |
| 6,025,841 A | 2/2000 | Finkelstein et al. |
| 6,188,401 B1 | 2/2001 | Peyer |
| 6,195,569 B1 | 2/2001 | Frederiksen |
| 6,292,099 B1 | 9/2001 | Tse et al. |
| 6,381,468 B1 | 4/2002 | Larsen et al. |
| 6,512,529 B1 | 1/2003 | Janssen et al. |
| 6,529,744 B1 | 3/2003 | Birkler et al. |
| 6,729,929 B1 | 5/2004 | Sayers et al. |
| 6,732,358 B1 | 5/2004 | Siefert |
| 6,757,372 B1 | 6/2004 | Dunlap et al. |
| 6,775,362 B1 | 8/2004 | Ransom |
| 6,892,067 B1 | 5/2005 | Sharma et al. |
| 6,928,468 B2 | 8/2005 | Leermakers |
| 6,964,061 B2 | 11/2005 | Cragun et al. |
| 6,976,217 B1 | 12/2005 | Vertaschitsch et al. |
| 6,983,421 B1 | 1/2006 | Lahti et al. |
| 7,003,327 B1 | 2/2006 | Payne et al. |
| 7,035,629 B2 | 4/2006 | Fuji |
| 7,096,474 B2 | 8/2006 | Wong et al. |
| 7,099,685 B2 | 8/2006 | Park et al. |
| 7,142,977 B2 | 11/2006 | Knuuttila et al. |
| 7,152,203 B2 | 12/2006 | Gao et al. |
| 7,158,788 B2 | 1/2007 | Holler et al. |
| 7,159,500 B2 | 1/2007 | John et al. |
| 7,165,099 B2 | 1/2007 | Sprigg et al. |
| 7,167,728 B1 | 1/2007 | Wagner et al. |
| 7,187,948 B2 | 3/2007 | Alden |
| 7,243,164 B2 | 7/2007 | Vegge |
| 7,275,243 B2 | 9/2007 | Gibbons et al. |

(Continued)

OTHER PUBLICATIONS

Binary Runtime Environment for Wireless—BREW™ 2.1 API Reference, QUALCOMM Incorporated, San Diego, CA, May 8, 2003, cover, copyright and pp. 376-416.

(Continued)

*Primary Examiner* — Omar Abdul-Ali
(74) *Attorney, Agent, or Firm* — Wolfe-SBMC

(57) ABSTRACT

Methods, systems and program products for hiding the presentation of a first input field that would obscure the presentation of a distinct second input field on a display device. User input directed to the second input field is accepted and provided the first input field instead of to the second input field. The contents of the first input field are copied to the second input field. The presentation of the second input field is updated on the display device to include the copied contents.

22 Claims, 5 Drawing Sheets

U.S. PATENT DOCUMENTS

| | | | |
|---|---|---|---|
| 7,283,841 | B2 | 10/2007 | Luke et al. |
| 7,299,289 | B1 | 11/2007 | Lorenz et al. |
| 7,299,409 | B2 | 11/2007 | Joshi et al. |
| 7,308,689 | B2 | 12/2007 | Black et al. |
| 7,310,784 | B1 | 12/2007 | Gottlieb et al. |
| 7,316,003 | B1 | 1/2008 | Dulepet et al. |
| 7,319,862 | B1 | 1/2008 | Lincoln et al. |
| 7,403,209 | B2 | 7/2008 | Liao et al. |
| 7,478,158 | B1 | 1/2009 | Rodgers et al. |
| 7,480,422 | B2 | 1/2009 | Ackley et al. |
| 7,603,113 | B2 | 10/2009 | Borcic et al. |
| 7,634,559 | B2 | 12/2009 | Brown |
| 7,639,943 | B1 | 12/2009 | Kalajan |
| 7,706,782 | B1 | 4/2010 | Hosmer et al. |
| 7,743,339 | B1 | 6/2010 | Chanda et al. |
| 2002/0140729 | A1 | 10/2002 | Price et al. |
| 2002/0152239 | A1 | 10/2002 | Bautista-Lloyd et al. |
| 2002/0161634 | A1 | 10/2002 | Kaars |
| 2002/0161796 | A1 | 10/2002 | Sylthe |
| 2003/0105845 | A1 | 6/2003 | Leermakers |
| 2003/0167318 | A1 | 9/2003 | Robbin et al. |
| 2003/0210270 | A1* | 11/2003 | Clow et al. ............ 345/767 |
| 2004/0034853 | A1 | 2/2004 | Gibbons et al. |
| 2004/0104938 | A1 | 6/2004 | Saraswat et al. |
| 2004/0203384 | A1 | 10/2004 | Sugikawa et al. |
| 2004/0213296 | A1 | 10/2004 | Kanayama et al. |
| 2004/0215652 | A1 | 10/2004 | Muller et al. |
| 2004/0237068 | A1* | 11/2004 | Ren ............ 717/110 |
| 2004/0260652 | A1 | 12/2004 | Rose |
| 2005/0090246 | A1 | 4/2005 | Leermakers |
| 2005/0131837 | A1 | 6/2005 | Sanctis et al. |
| 2005/0172154 | A1 | 8/2005 | Short et al. |
| 2005/0215238 | A1 | 9/2005 | Macaluso |
| 2005/0226188 | A1 | 10/2005 | Santhoff et al. |
| 2005/0246193 | A1 | 11/2005 | Roever et al. |
| 2005/0246703 | A1 | 11/2005 | Ahonen |
| 2005/0246726 | A1 | 11/2005 | Labrou et al. |
| 2005/0266884 | A1 | 12/2005 | Marriott et al. |
| 2006/0013502 | A1 | 1/2006 | Weigand |
| 2006/0015819 | A1 | 1/2006 | Hawkins et al. |
| 2006/0026304 | A1 | 2/2006 | Price |
| 2006/0123360 | A1 | 6/2006 | Anwar et al. |
| 2006/0153040 | A1 | 7/2006 | Girish et al. |
| 2006/0165104 | A1 | 7/2006 | Kaye |
| 2006/0171515 | A1 | 8/2006 | Hintermeister et al. |
| 2006/0184968 | A1 | 8/2006 | Clayton et al. |
| 2006/0200815 | A1 | 9/2006 | Li |
| 2006/0206918 | A1 | 9/2006 | McLean |
| 2006/0224943 | A1 | 10/2006 | Snyder et al. |
| 2006/0250578 | A1 | 11/2006 | Pohl et al. |
| 2006/0252462 | A1 | 11/2006 | Balakrishnan et al. |
| 2006/0256130 | A1 | 11/2006 | Gonzalez |
| 2006/0265508 | A1 | 11/2006 | Angel et al. |
| 2006/0271696 | A1 | 11/2006 | Chen et al. |
| 2007/0026799 | A1 | 2/2007 | Wang et al. |
| 2007/0038931 | A1 | 2/2007 | Allaire et al. |
| 2007/0130331 | A1 | 6/2007 | Kao et al. |
| 2007/0140116 | A1 | 6/2007 | Vega-Garcia |
| 2007/0155310 | A1 | 7/2007 | Borcic et al. |
| 2007/0155425 | A1 | 7/2007 | Balakrishnan et al. |
| 2007/0155426 | A1 | 7/2007 | Balakrishnan et al. |
| 2007/0156841 | A1 | 7/2007 | Balakrishnan et al. |
| 2007/0157194 | A1 | 7/2007 | Balakrishnan et al. |
| 2007/0220504 | A1 | 9/2007 | Eker |
| 2007/0277230 | A1 | 11/2007 | Hawkins et al. |
| 2008/0059533 | A1 | 3/2008 | Krikorian |
| 2008/0077956 | A1 | 3/2008 | Morrison et al. |
| 2008/0127060 | A1 | 5/2008 | Reamey |
| 2008/0147671 | A1 | 6/2008 | Simon et al. |
| 2008/0184128 | A1 | 7/2008 | Swenson et al. |
| 2008/0222520 | A1 | 9/2008 | Balakrishnan et al. |
| 2008/0261657 | A1 | 10/2008 | Amit |
| 2008/0268911 | A1 | 10/2008 | Eronen et al. |
| 2009/0031418 | A1 | 1/2009 | Matsuda et al. |
| 2009/0042599 | A1 | 2/2009 | Scott |
| 2009/0094272 | A1 | 4/2009 | Skriletz |

OTHER PUBLICATIONS

Chanda, "Embedded Document within an Application," Pending U.S. Appl. No. 11/567,111, filed Dec. 5, 2006, 24 pages, to be published by USPTO.

Morris, et al., "Mobile Rich Media Information System," Pending U.S. Appl. No. 10/791,298, filed Mar. 1, 2004, 43 pages, to be published by USPTO.

Notification of Transmittal of the International Search Report and the Written Opinion of the International Searching Authority, or the Declaration for Application No. PCT/US2008/056278, dated Aug. 12, 2009, 15 pages.

Adobe Systems Inc., "Flex 2 Developer's Guide" [Online], 2006, San Jose, CA, Retrieved from the Internet: <URL: http://download.macromedia.com/pub/documentation/en/flex/2/flex2_devguide.pdf>, pp. 1-17, 21-39, 83-129, 1113-1129.

Flanagan, David, "Java™ Foundation Classes in a Nutshell: A Desktop Quick Reference." Section 2.6, O'Reilly Publishing, Sep. 1999, 8 pages.

Hosmer, et al., "System and Method for Developing Information for a Wireless Information System," Pending U.S. Appl. No. 10/791,299, filed Mar. 1, 2004, 26 pages, to be published by USPTO.

Rodgers, et al. "Bandwidth Management System," Pending U.S. Appl. No. 10/791,311, filed Mar. 1, 2004, 27 pages, to be published by USPTO (7,478,158).

USPTO Non-Final Office Action in U.S. Appl. No. 12/577,035, mailed Jul. 25, 2011, 14 pages.

U.S. Appl. No. 11/567,111.

U.S. Appl. No. 12/577,035.

Business Wire, "BSquare Delivers PDF Viewing Capabilities for Windows Powered Devices", Oct. 16, 2000, pp. 1-2.

* cited by examiner

RENDERING TEXT IN A BREW DEVICE

CROSS REFERENCE TO RELATED APPLICATION

This application is a continuation of, and therefore claims priority to, U.S. patent application Ser. No. 11/670,333 filed on Feb. 1, 2007, now U.S. Pat. No. 7,743,339, the contents of which are incorporated by reference in this specification.

BACKGROUND

The Binary Runtime Environment for Wireless (BREW) is an application development framework for mobile phones and other devices based on a chip set manufactured by QUALCOMM Incorporated of San Diego, Calif. The BREW system provides by way of an Application Programming Interface (API) a visual text input control for applications to capture and display key presses received from a device keypad. However, the text input control typically occupies a large portion of the display, obscuring all else, and renders text without any style. For rich content applications, this brings a reduced user experience since whenever there is a need to input text, a full-screen sized dialog box will pop up and obscure the rich content.

SUMMARY

In general, one aspect of the subject matter described in this specification can be embodied in a method that includes hiding the presentation of a first input field that would obscure the presentation of a distinct second input field on a display device. User input directed to the second input field is accepted and provided to the first input field instead of to the second input field. The contents of the first input field is copied to the second input field. The presentation of the second input field is updated on the display device to include the copied contents. Other implementations of this aspect include corresponding systems, apparatus, and computer program products.

These and other implementations can optionally include one or more of the following features. The first input field is a Binary Runtime Environment for Wireless (BREW) text input control and the second input field is a BREW text field. A character in a first current position for the first input field is copied to a second current position for the second input field. The copying is performed if the character in the first current position is different from the character in the second current position. A second cursor position for the second input field is automatically updated based on a first cursor position for the first input field. Providing the user input to the first text field includes detecting when the second input field has input focus. The user input is a key press or a gesture on the display device.

Particular implementations of the subject matter described in this specification can be implemented to realize one or more of the following advantages. Users can input text into text fields without the text fields being obscured by a text input control. Users can interact with rich content directly. The BREW text input control is utilized without requiring the control to be displayed. Content of the BREW text input control is automatically copied to a text field that is visible on a display device. The cursor positions of the BREW text input control and a text field are automatically synchronized.

DESCRIPTION OF DRAWINGS

Like reference symbols in the various drawings indicate like elements.

DETAILED DESCRIPTION

Figures 1A, 1B:
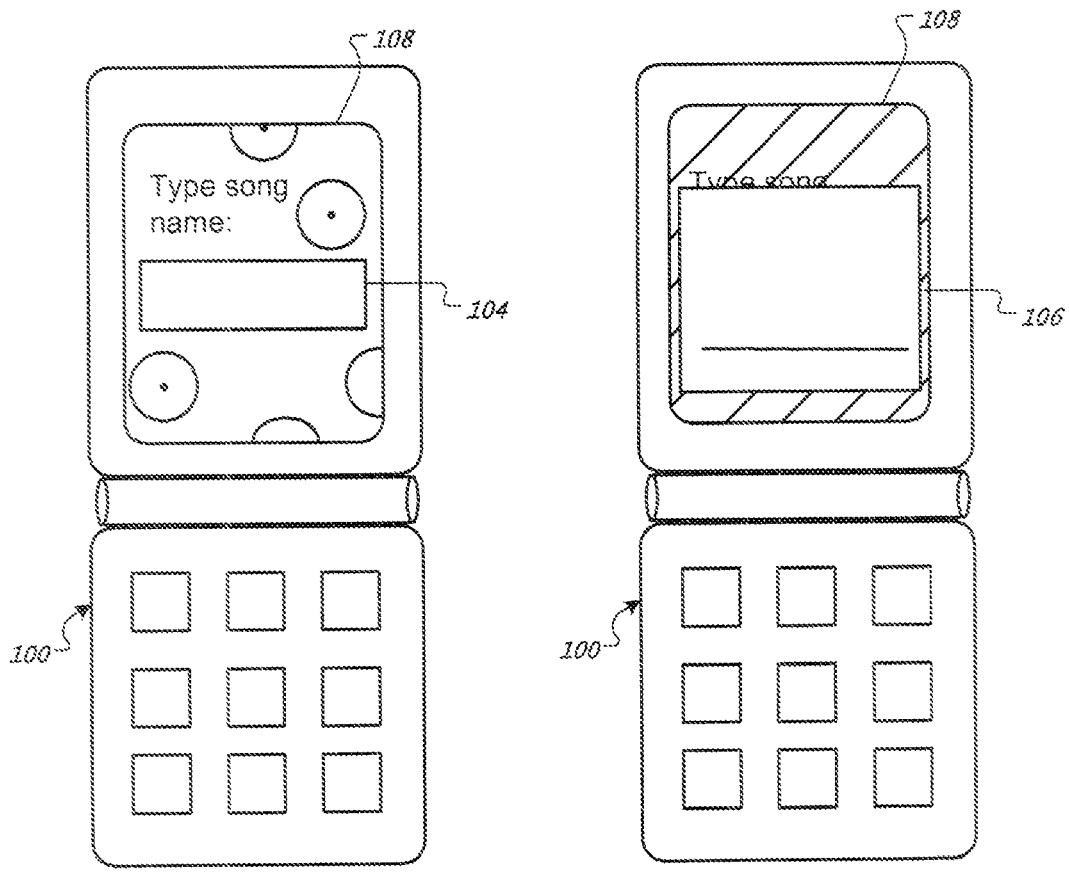
FIGS. 1A-B are schematic diagrams illustrating text input.

FIGS. 1A-B are a schematic diagrams illustrating text input. Applications can be created to run on computing devices, such as the device 100. The device 100 can be a cellular phone, personal digital assistant (PDA), laptop computer, Pocket PC, electronic gaming device, media player, or combinations of these, for example. In various implementations, the device 100 is capable of running applications created using the BREW platform. The computing device 100 includes a display device (or display) 108. The display 108 is configured to present a graphical user interface (GUI) for applications running on the device 100, for example music download application programs, which run on the computing device 100. Typically, device operating systems include software libraries that provide GUI functionality. Applications can utilize these libraries to present text fields, such as a text field 104, for accepting user input (e.g., numbers, letters and symbols) and displaying the user input. The text field 104 can appear seamlessly in the user interface along with other user interface components, such as buttons and graphics. In various implementations, text fields can display text in different fonts and styles.

Text input control 106 (shown in FIG. 1B) can be used to convert numeric input retrieved from a numeric keypad into alpha-numeric characters and is normally displayed when users attempt to type characters in text field 104. In some environments, such as in a Flash application running in a BREW environment, the text input control 106 is displayed in an enlarged size, on top of the application text field 104. In various implementations, the text input control 106 can interpret input from a numeric keypad, such as a numeric keypad of a cellular phone. The text input control 106 can convert user input, for example, by converting a numeric digit input (e.g., "2") into an alphabetic character (e.g., "a"). Conversion from numeric digits to alphabetic characters can be necessary for devices that do not include a full-sized keyboard. For example, if the user repeatedly presses a digit key (e.g., "2"), the text input control can interpret those presses as "cycling" to other characters represented by the key being pressed (e.g., "2" can represent "a", "b", "c" and also the character "2"). In some environments, the text input control 106 does not support the ability to show styled text.

Figure 2:
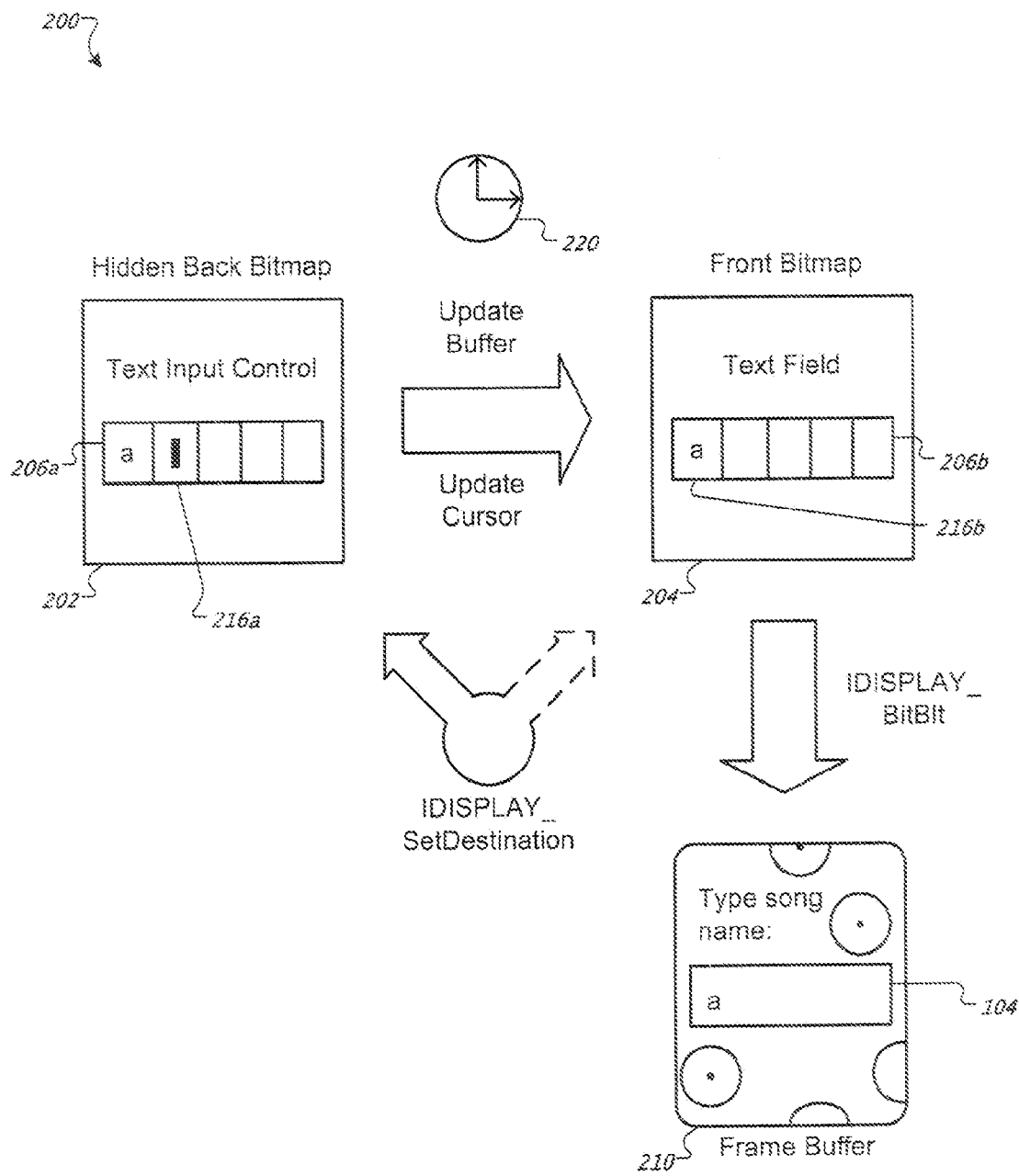
FIG. 2 is a schematic diagram illustrating the use of two text buffers in a BREW application.

FIG. 2 is a schematic diagram 200 illustrating the use of two text buffers in a BREW application. An application can use both the text field 104 and the text input control 106. The text input control 106 is configured so that the text input control 106 is not presented on the display 108. The text input control 106 intercepts user input meant for the text field 104 and can optionally interpret the input (e.g., converting keypad digit input into alphabetic characters). The text field 104 can be used for rendering characters input by users, since the text field 104 can display styled text (e.g., bold and italic) and can appear seamlessly in a user interface. The user input that is intercepted and interpreted by the text input control 106 is copied to the text field 104 which is displayed on the display 108. Users will see their input displayed in the text field 104 as they are entering data without any knowledge of the intervening text input control 106.

Graphical content, such as the text field 104, can be presented on the display 108 by being first rendered on a bitmap. In various implementations, the text input control 106 is rendered to a hidden "back" bitmap 202 and the text field 104 is rendered to a visible "front" bitmap 204. In a BREW application, an IDISPLAY_SetDestination BREW API function can be used to control which bitmap is associated with the display 108. The back bitmap 202 is associated with the display 108 in order to intercept users' key press events. The contents of the back bitmap 202 will not be presented on the display 108, however. After the user input has been interpreted by the text input control 106 and copied to the text field 104, the front bitmap 204 can be associated with the display 108. In a BREW environment, an IDISPLAY_BitBlt API function can then be used to copy the front bitmap 204 to a frame buffer 210 which will cause the bitmap 204 (including text field 104) to be presented (e.g., composited) on the display 108.

The text input control 106 and the text field 104 can each have an associated text buffer. A text buffer can be used to store characters. A text buffer 206a is associated with the text input control 106 and a text buffer 206b is associated with the text field 104. Text buffers can have associated cursors which represent a position within the buffer where new characters can be inserted. For example, a cursor 216a is associated with the text buffer 206a and a cursor 216b is associated with the text buffer 206b.

The contents of the text buffers 206a and 206b can be synchronized with the use of a timer 220. The timer 220 can trigger processing at specific intervals, for example every 30 milliseconds. At each timer interval, the cursor position 216a can be compared to the cursor position 216b. If the cursor positions are different, the contents of the text buffer 206a can be copied to the text buffer 206b and the cursor position 216b can be set to be equal to the cursor position 216a.

The timer 220 can be also used to recognize when a numeric input should be accepted and interpreted. For example, if the user presses the "2" key, after a certain interval of time has elapsed with no further input the "2" input can be accepted as an "a". However, if the user presses the "2" key repeatedly, with relatively short periods of time between key presses, the input can be interpreted as first an "a", and then a "b" after the second press, a "c" after the third press, a "2" after the fourth press, and an "a" after the fifth press, and so on. An input can also be accepted if subsequently a different key is pressed. For example, if a "3" input follows a "2" input, the "2" input can be accepted as "a" immediately after the "3" input. The "3" input can be interpreted initially as a "d", pending further input from the user.

Figure 3:
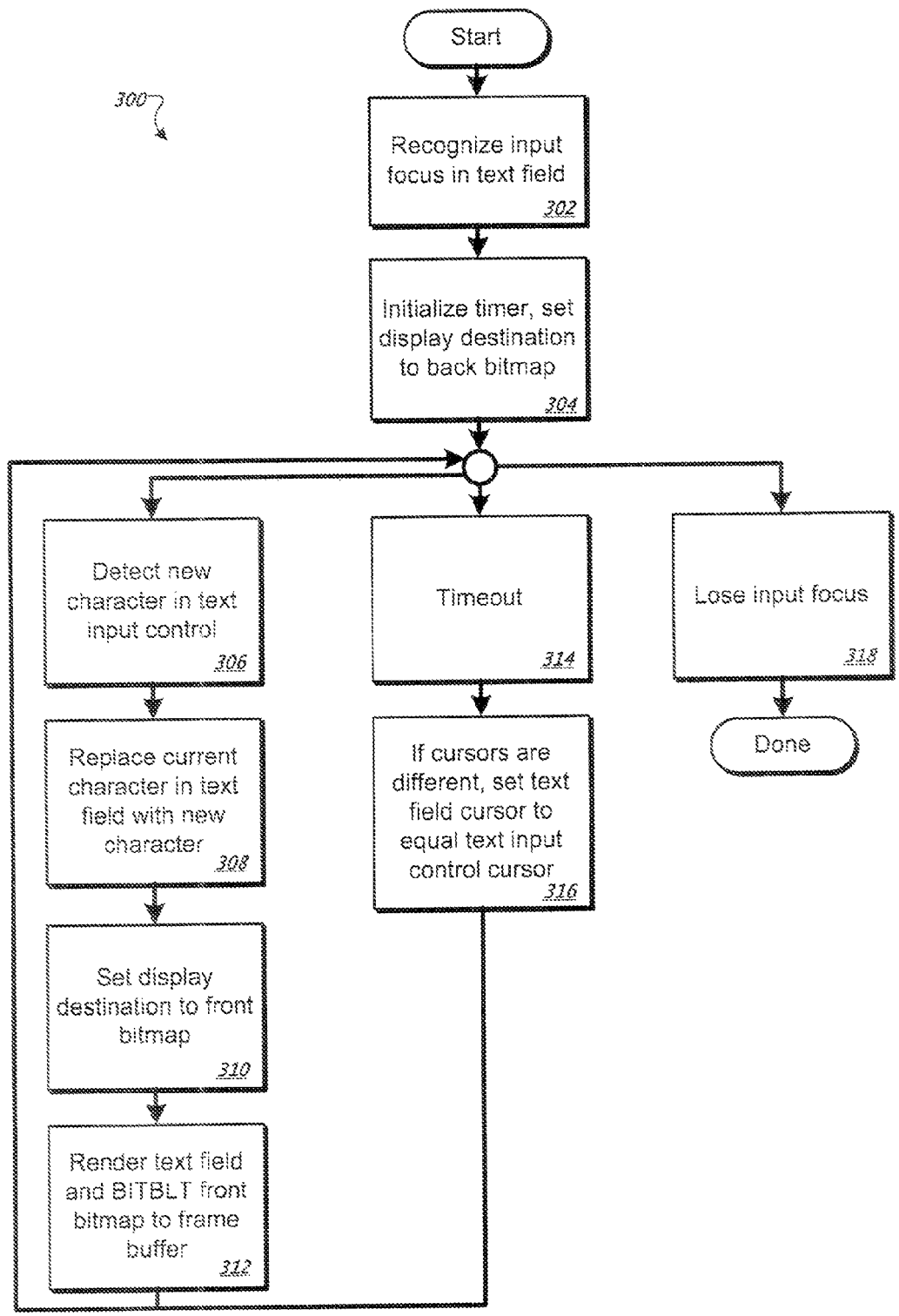
FIG. 3 is a flowchart of a method for text input processing.

FIG. 3 is a flowchart of a method 300 for text input processing. Input focus is recognized in a text field (e.g., text field 104) of an application (e.g., a Flash application running in a BREW environment; step 302). For example, input events such as navigating to a text field through the use of an arrow key or finger gesture on a display device can be recognized.

A timer is initialized (e.g., timer 220), and the display destination is set to the back bitmap (e.g., bitmap 202; step 304). The timer is configured so that processing is repeatedly performed after a certain interval of time (e.g., 30 milliseconds) has elapsed. In a BREW environment, the display destination is set to the back bitmap by using an IDISPLAY_SetDestination BREW API function. A text input control (e.g., 106) is created and associated with the back bitmap and configured to intercept user input.

After the timer has been initialized and the display destination has been set to the back bitmap one of several events can occur. For example, the timer interval can elapse (step 314), the text field can lose input focus (step 318) or a character input can be detected in the text input control (step 306). If the user enters a character while the text field has the input focus, the new character is detected by the text input control (step 306). For example, the user can press the "2" key with the intention of having the "2" be interpreted as an "a". As another example, a new input can be a "3" key (interpreted as "d") which has been pressed after a "2" key (interpreted as "a").

The current character (e.g., "a") in the text field can be replaced with the new character (e.g., "b"; step 308). For example, a new input of "2", received shortly after a previous input of "2" can be interpreted as cycling from an "a" input to a "b" input. An "a" character in the text field can be replaced with a "b" character and the "b" character can be highlighted. Alternatively, the current character in the text field is replaced only if the new character is different than the current character.

After the character has been replaced the display destination is set to the front bitmap (e.g., bitmap 204; step 310). In a BREW environment, the destination can be set to the front bitmap by using an IDISPLAY_SetDestination API function. The text field (e.g., 104) is rendered to the front bitmap (e.g., 204) which is then copied to the frame buffer (e.g., 210; step 312). After the contents of the front bitmap are presented on the display, the display destination can be set back to the back bitmap so that additional user input events will be intercepted by the text input control.

After a timer (e.g., 220) interval has elapsed, a timeout can be recognized (step 314). If a cursor position (e.g., 216b) associated with the text field (e.g., 104) is different than a cursor position (e.g., 216a) associated with the text input control (e.g., 106), the text field cursor can be set equal to the text input control cursor (step 316). For example, the cursors may be different if the user had previously pressed a key (e.g., "2", interpreted as "a") and then paused without pressing any other keys. In this example, the text field cursor can be changed so that it is positioned after the "a" rather than "on" the "a". The "a" character, which may have been previously highlighted, can be displayed without highlighting.

If input focus is transferred to another input control the loss of focus of the text field is detected (step 318). For example, the user may have put focus on another control using an arrow key. The text input control (e.g., 106) can be destroyed (e.g., in a BREW application, an ITEXTCTL_Release API function can be used), the display destination can be set to the front bitmap (e.g., 204), and the back bitmap (e.g., 202) can be destroyed (e.g., in a BREW environment, an IBITMAP_Release API function can be used).

Figure 4:
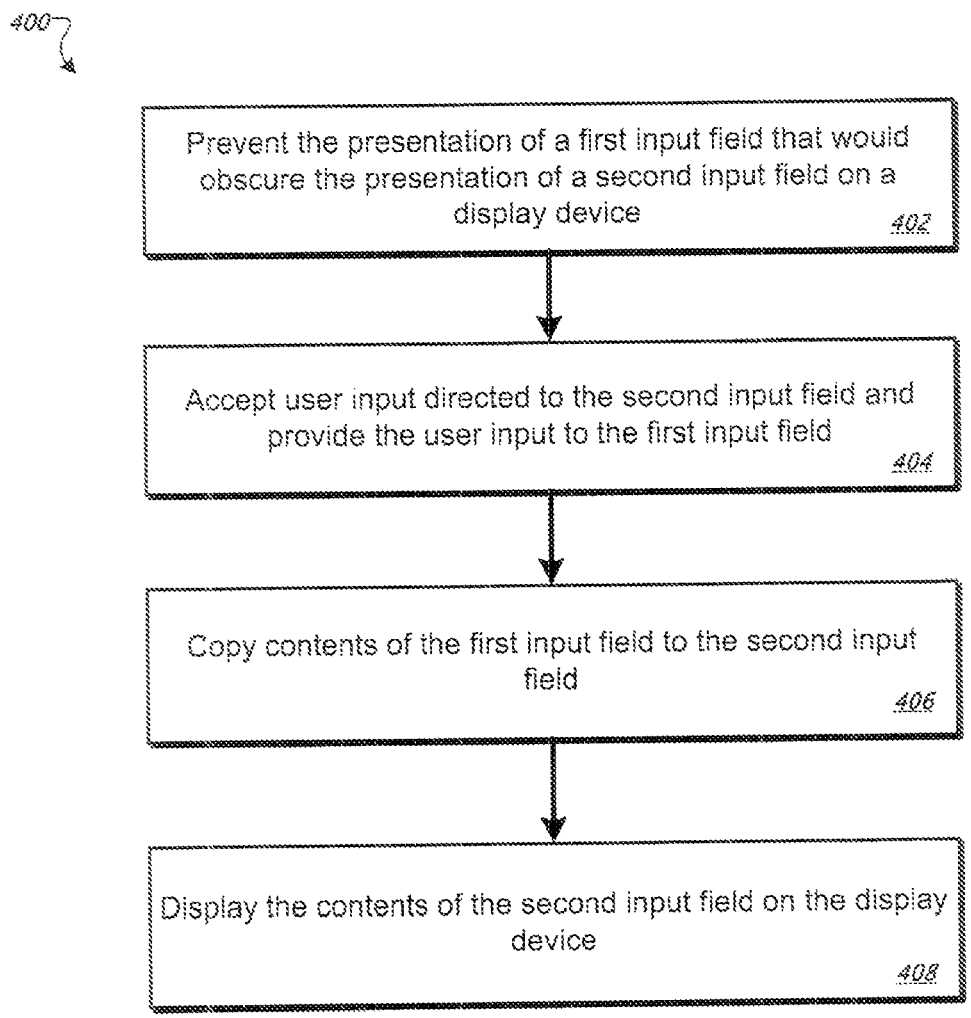
FIG. 4 is a flowchart of a method for updating the presentation of a text field.

FIG. 4 is a flowchart of a method 400 for updating the presentation of a text field. A first input field (e.g., 106) that would obscure the presentation of a second input field (e.g., 104) on a display device (e.g., 108) is prevented from being presented on the display device (step 402). User input directed to the second input field is accepted and provided to the hidden first input field instead (step 404). The first input field can optionally provide character processing, as described above. Contents of the first input field are then copied to the second user input field (step 406). The contents of the second input field are presented on the display device (step 408). From a user's perspective, the use has entered a character into a single text input field—the user is unaware of the fact that there are two input fields.

Figure 5:
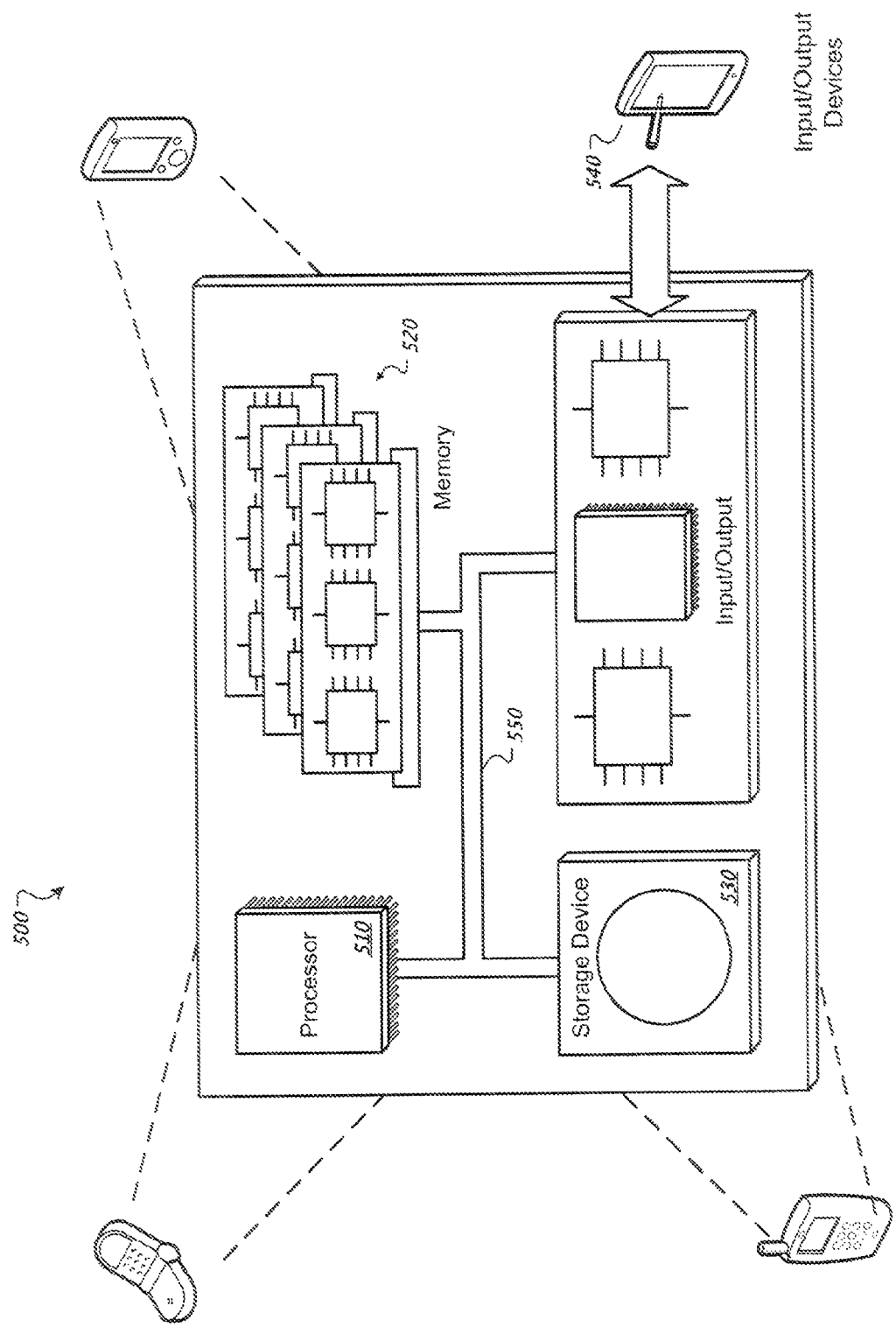
FIG. 5 is a schematic diagram of a generic computing device.

FIG. 5 is a schematic diagram of a generic computing device 500, such as a cell phone, a smart phone, an electronic game device, a personal digital assistance, a digital media player, other devices, or combinations of these. The device 500 can be used for practicing operations described in association with the flow diagrams 300 and 400. The device 500 can include a processor 510, a memory 520, a storage device 530, and input/output devices 540. Each of the components 510, 520, 530, and 540 are interconnected using a system bus 550. The processor 510 is capable of processing instructions for execution within the system 500. Such executed instructions can implement the methods associated with flow diagrams 300 or 400, for example. The processor 510 is a single-threaded or multi-threaded processor, and may include a plurality of processors working in concert. The processor 510 is capable of processing instructions stored in the memory 520 or on the storage device 530 to display graphical information for a user interface on the input/output device 540 (e.g., display 108).

The memory 520 is a computer readable medium such as volatile or non volatile random access memory that stores information within the system 500. The memory 520 could store data structures representing a text field 104 and a text input control 106, for example. The storage device 530 is capable of providing persistent storage for the system 500. The storage device 530 can be a floppy disk device, a hard disk device, an optical disk device, a flash drive, or a tape device, or other suitable persistent storage means.

The input/output devices 540 provide input/output operations for the system 500. In one implementation, the input/output device 540 includes a keyboard, stylus and/or pointing device. In another implementation, the input/output device 540 includes a display unit for displaying graphical user interfaces. The input/output device 540 can provide input/output operations for the applications running on device 500. An application program presents a document on a display, for example, an Adobe Flash document, and enables users to input characters into the document by way of text fields. Techniques for presenting documents in the BREW system are provided in U.S. patent application Ser. No. 11/567,111, entitled EMBEDDED DOCUMENT WITHIN AN APPLICATION, by Rupen Chanda, filed on Dec. 5, 2006, which is incorporated herein by reference in its entirety. Adobe Flash is an Integrated Development Environment (IDE) for developing Flash documents that support, for instance, rich content, user interfaces, and web applications. Adobe Flash Lite is a virtual machine used to render Flash documents on computing device displays. Flash and Flash Lite are available from Adobe Systems Incorporated of San Jose, Calif. Flash documents are commonly used to create interactive content such as advertisements, video, and rich, client-side applications.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A computer-implemented method, comprising:
    detecting a selection of input focus on an interactive data input field presented on a display device, wherein input focus on the interactive data input field indicates that the interactive data input field is designated as a target for input received through a user interface of the display device;
    receiving, through the user interface, input directed to the interactive data input field when the interactive data input field has input focus;
    providing, by operation of a computer, the input to a hidden input buffer instead of to the interactive data input field, where providing the input to the hidden input buffer includes interpreting the input received through the user interface;
    copying, by operation of a computer, content of the hidden input buffer to the interactive data input field in response to providing the input to the hidden input buffer, wherein the content in the hidden input buffer includes the input provided to the hidden input buffer and copying content of the hidden input buffer to the interactive data input field includes copying the interpreted input, wherein copying includes copying a character in a current position for the hidden input buffer to a current position for the interactive data input field; and
    updating, by operation of a computer, the presentation of the interactive data input field on the display device to include the copied contents.

2. The method of claim 1 wherein updating the presentation of the interactive data input field on the display device to include the copied content includes displaying styled text.

3. The method of claim 1 further comprising hiding a presentation of an interactive text field on the display device where the presentation of the interactive text field would obscure the presentation of the interactive data input field on the display device, wherein the interactive text field is a text input control that is instantiated when input focus is on the interactive data input field.

4. The method of claim 1 wherein the copying is performed in response to receiving, through the user interface, input to change the character in the current position for the hidden input buffer.

5. The method of claim 1 wherein the copying is performed in response to updating a cursor position for the hidden input buffer.

6. The method of claim 5 wherein the cursor position is updated in response to receiving, through the user interface, input directed to a new position in the interactive data input field.

7. The method of claim 5 wherein the cursor position is updated if the character in the current position for the hidden input buffer is not changed based on input received through the user interface for a predetermined period.

8. The method of claim 1, further comprising automatically updating a cursor position for the interactive data input field based on a change to a cursor position for the hidden input buffer.

9. The method of claim 1 wherein the input received through the user interface includes recognizing a gesture on the display device.

10. The method of claim 1 wherein interpreting the input includes converting numerical input to alphanumeric characters.

11. A computer program product, encoded on a machine-readable storage device, operable to cause data processing apparatus to perform operations comprising:
    detecting a selection of input focus on an interactive data input field presented on a display device, wherein input focus on the interactive data input field indicates that the interactive data input field is designated as a target for input received through a user interface of the display device;

receiving, through a user interface, input directed to the interactive data input field when the interactive data input field has input focus;

providing the received input to a hidden input buffer, wherein providing the received input to the hidden input buffer includes interpreting the received input;

copying content of the hidden input buffer to the interactive data input field in response to providing the received input to the hidden input buffer, wherein the content in the hidden input buffer includes the input provided to the hidden input buffer and copying content of the hidden input buffer to the interactive data input field includes copying the interpreted input, wherein copying includes copying a character in a current position for the hidden input buffer to a current position for the interactive data input field; and updating the presentation of the interactive data input field on the display device to include the copied contents.

12. The computer program product of claim 11 wherein copying content of the hidden input buffer to the interactive data input field includes copying the content of the hidden input buffer to a buffer corresponding to the interactive data input field.

13. The computer program product of claim 11 wherein the hidden input buffer corresponds to a hidden first bitmap and the interactive data input field corresponds to a second bitmap and updating the presentation of the interactive data input field on the display device to include the copied contents includes copying the second bitmap to a visible frame buffer.

14. The computer program product of claim 11 wherein the interactive data input field is a text field.

15. The computer program product of claim 11, further comprising updating a cursor position for the interactive data input field based on change to a cursor position for the hidden input buffer.

16. The computer program product of claim 15 wherein the cursor position for the hidden input buffer is changed in response to one of:

receiving, through the user interface, input directed to a new position in the interactive data input field; or determining that the character in the current position for the hidden input buffer is not changed based on input received through the user interface for a predetermined period.

17. The computer program product of claim 11 wherein the received input includes a gesture detected on the display device.

18. A system comprising:

a display device;

a computer-readable storage device storing instructions for causing one or more processors to perform operations; and one or more processors operable to execute the instructions stored on the computer-readable storage device to perform operations including:

receiving, from a user interface of the display device, input directed to an interactive data input field when the interactive data input field has input focus, wherein input focus on the interactive data input field indicates that the interactive data input field is designated as a target for input received through the user interface;

providing the received input to a hidden input buffer, wherein providing the received input to the hidden input buffer includes interpreting the received input;

copying content of the hidden input buffer to the interactive data input field in response to providing the received input to the hidden input buffer, wherein the content in the hidden input buffer includes the input provided to the hidden input buffer and copying content of the hidden input buffer to the interactive data input field includes copying the interpreted input, wherein copying includes copying a character in a current position for the hidden input buffer to a current position for the interactive data input field; and updating the presentation of the interactive data input field on the display device to include the copied contents.

19. The system of claim 18 wherein the one or more processors are operable to execute the instructions stored on the computer-readable storage device to perform further operations including:

generating a first hidden bitmap including the content in the hidden input buffer; and generating a second bitmap including copied contents of the interactive data input field.

20. The system of claim 19 wherein the one or more processors are operable to execute the instructions stored on the computer-readable storage device to perform further operations including copying the second bitmap to a frame buffer for presentation on the display device.

21. The system of claim 18 wherein copying content of the hidden input buffer to the interactive data input field is performed in response to a particular period elapsing.

22. The system of claim 18 wherein the one or more processors are operable to execute the instructions stored on the computer-readable storage device to perform further operations including:

detecting a change to a character in a current position of the hidden input buffer in response to input received through the user interface; and detecting a change to a current cursor position in the hidden input buffer in response to at least one of input received through the user interface or a particular period without input through the user interface.

* * * * *